(12) United States Patent
Liu et al.

(10) Patent No.: US 11,347,912 B2
(45) Date of Patent: May 31, 2022

(54) PREDICTION METHOD OF POROUS MATERIAL AND THE SYSTEM THEREOF

(71) Applicant: Feng Chia University, Taichung (TW)

(72) Inventors: Yu-Cheng Liu, Taichung (TW);
Jin-Huang Huang, Taichung (TW);
Jui-Chu Weng, Taichung (TW);
Tzu-Hsuan Lei, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 215 days.

(21) Appl. No.: 16/727,812

(22) Filed: Dec. 26, 2019

(65) Prior Publication Data
US 2020/0218841 A1  Jul. 9, 2020

(30) Foreign Application Priority Data

Jan. 3, 2019 (TW) ................................ 108100132

(51) Int. Cl.
*G06F 30/30* (2020.01)
*G06F 30/20* (2020.01)
*H04R 29/00* (2006.01)

(52) U.S. Cl.
CPC .............. *G06F 30/30* (2020.01); *G06F 30/20* (2020.01); *H04R 29/00* (2013.01)

(58) Field of Classification Search
CPC .......... G06F 30/30; G06F 30/20; H04R 29/00
See application file for complete search history.

(56) References Cited

U.S. PATENT DOCUMENTS

| 2013/0243221 | A1* | 9/2013 | Hsieh | ..................... H03G 5/165 |
| | | | | 381/103 |
| 2014/0054104 | A1* | 2/2014 | He | ......................... H04R 7/125 |
| | | | | 181/167 |

OTHER PUBLICATIONS

Tsai, Y.T. and Huang, J.H., 2014. Loudspeaker parameters inverse problem for improving sound frequency response simulation. International Journal of Mechanical and Mechatronics Engineering, 8(8), pp. 1331-1335. (Year: 2014).*

Liu, Y.C., Huang, J.H., Huang, C.H., Her, H.C. and Chuang, Y.C., 2014. Evaluation of Acoustic Characteristics for various Composite Ventilation Material by using Impedance Tube. In Advanced Materials Research (vol. 910, pp. 78-81). Trans Tech Publications Ltd. (Year: 2014).*

(Continued)

*Primary Examiner* — Chuen-Meei Gan
(74) *Attorney, Agent, or Firm* — Cheng-Ju Chiang

(57) ABSTRACT

The invention discloses a prediction method for porous material of electroacoustic devices and prediction system thereof. The method comprises the following steps. The step (A) is to obtain at least one acoustic parameter of a porous material from an electroacoustic device, and the at least one acoustic parameter comprises a flow resistance value, a specific flow resistance value and a flow resistance ratio. The step (B) is to calculate an actual resistance value of the porous material based on the at least one acoustic parameter. Thereafter, the step (C) establishes an equivalent circuit model corresponding to the electroacoustic device based on the structure configuration and material parameters of the electroacoustic device. At last, step (D) introduces the actual impedance value of the porous material into the equivalent circuit model, and calculates the frequency response curve and impedance curve of the electroacoustic device affected by the porous material.

4 Claims, 6 Drawing Sheets

(56) References Cited

OTHER PUBLICATIONS

Klippel, W. and Seidel, U., 2001. Fast and accurate measurement of linear transducer parameters. Preprints-Audio Engineering Society. (Year: 2001).*

Liu, Y.C., Huang, Y.C., Tang, Y.J. and Lei, T.H., 2019. Evaluations of Absorption Materials Applied in the Noise Reduction: Experiment and Simulation. In Materials Science Forum (vol. 947, pp. 125-129). Trans Tech Publications Ltd. (Year: 2019).*

* cited by examiner

300

PREDICTION METHOD OF POROUS MATERIAL AND THE SYSTEM THEREOF

TECHNICAL FIELD

The invention relates to a prediction method of porous material and the system thereof, in particular, a prediction method of porous material and the prediction system of an electroacoustic device which applied to, such as a loudspeaker or a microphone.

BACKGROUND OF RELATED ARTS

Ventilation material is a very important part for electroacoustic devices (such as speaker, receiver, loudspeaker, microphone, etc.), but its physical mechanism is relatively complex. Because of its acoustic resistance, it can reduce a vibration amplitude of the vibration system in various electroacoustic devices, and then reduce a sound pressure performance at the resonance frequency. In addition, due to the influence of ventilation material on the performance of sound, it is also known as tuning paper or damping paper.

At present, the method of try & error is still adopted in the selection of ventilation materials used in electroacoustic devices. Different ventilation materials are attached on the electroacoustic device, and the approach of listening and testing is used for selection, which is not only time-consuming and labor-consuming, but also lack of scientific basis. Therefore, the main purpose of the invention is to construct a simulation and prediction system with scientific data and the method thereof for the selection of ventilation materials applied to the electroacoustic devices.

SUMMARY

To resolve the drawbacks of the prior arts, the present invention discloses a prediction method applied to a porous material in an electroacoustic device. It can be used to predict and analyze porous material with unknown parameters. It is convenient for product designers to effectively simulate the frequency response curve and impedance curve of the electroacoustic device affected by the porous material before product development.

A prediction method of porous material of the invention comprises the following steps: (A) determining at least one acoustic parameter of a porous material of an electroacoustic device, wherein the at least one acoustic parameter includes a flow resistance value, a specific flow resistance value and a flow resistance ratio of said porous material; (B) determining an actual impedance value of the porous material based on the at least one acoustic parameter; (C) creating an equivalent circuit model of the electroacoustic device based on a structural configuration relationship and material parameters of the electroacoustic device; and (D) introducing the actual impedance value of the porous material into the equivalent circuit model to determine a frequency response curve and an impedance curve of the electroacoustic device.

A prediction method of porous material of the invention comprises an electroacoustic device with a porous material; an equivalent circuit model building module connected with the electroacoustic device, wherein an equivalent circuit model is established by the equivalent circuit model building module based on a structural configuration relationship and material parameters of the electroacoustic device; a flow resistance measurement module connected with the electroacoustic device to measure at least one acoustic parameter of the electroacoustic device; and a simulation calculation module connected with the equivalent circuit model building module and the flow resistance measurement module, wherein an actual impedance value of the porous material is calculated by the simulation calculation module based on the at least one acoustic parameter, and introducing the equivalent circuit model to simulate a frequency response curve and an impedance curve of the electroacoustic device.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

The invention provides a prediction method and for porous materials in an electroacoustic device and the system thereof, which can effectively simulate the frequency response curve and impedance curve of the electroacoustic device affected by the porous materials, so as to accurately grasp the performance of products and save the time and cost of product development.

Figure 1:
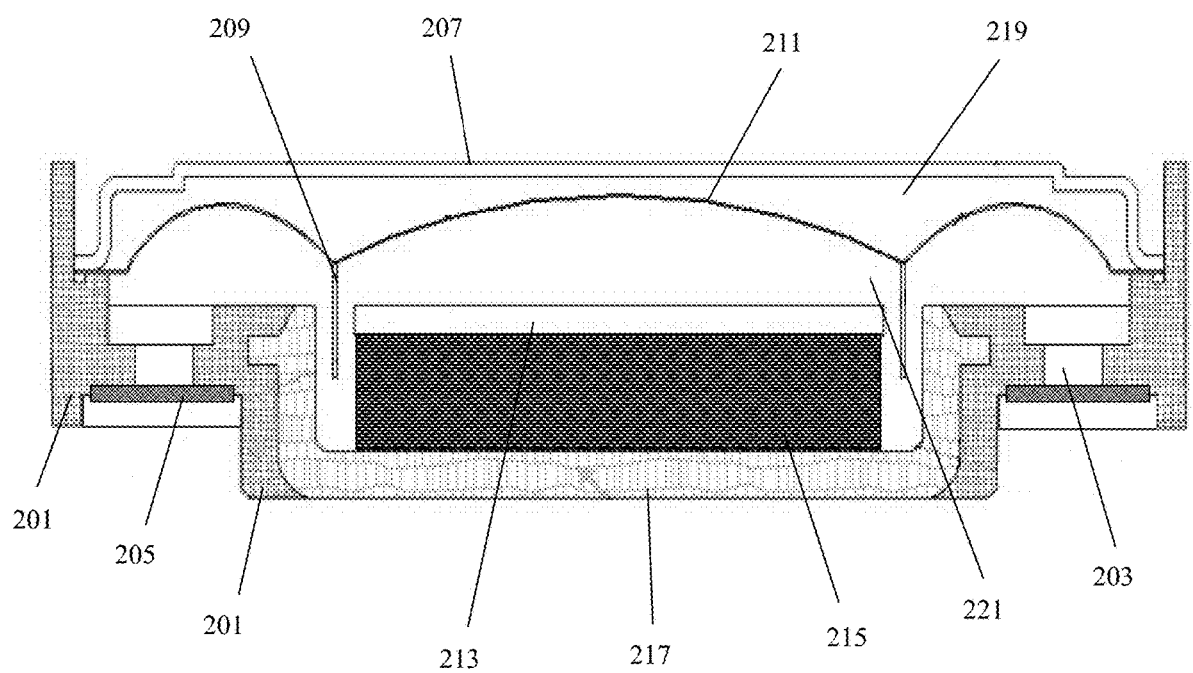
FIG. 1 illustrates a sectional drawing of a moving coil loudspeaker in one preferred embodiment of the invention.
Figure 2:
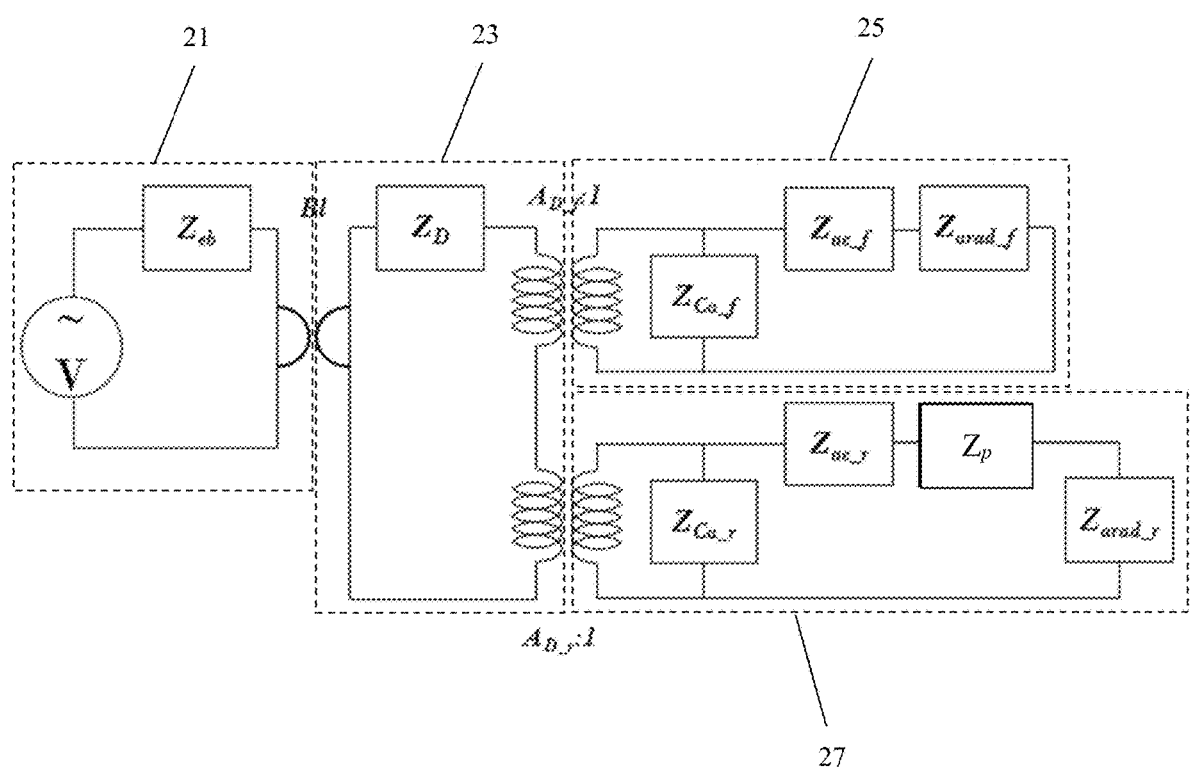
FIG. 2 illustrates a schematic diagram of the equivalent circuit model of the moving coil loudspeaker in one preferred embodiment of the invention corresponding to FIG. 1.

First, please refer to FIG. 1 and FIG. 2. FIG. 1 illustrates the sectional drawing of a moving coil loudspeaker in one preferred embodiment of the invention, and FIG. 2 illustrates the schematic diagram of the equivalent circuit model of the moving coil loudspeaker in one preferred embodiment of the invention corresponding to FIG. 1. The equivalent circuit model 20 of the moving coil loudspeaker 200 is established by the equivalent circuit method, and can be used to simulate and analyze the characteristics of the internal components and structure of the moving coil loudspeaker 200 and the impact on the sound transmission, and then simulate and analyze the different characteristics of the moving coil loudspeaker 200.

The equivalent circuit model 20 of a moving coil loudspeaker includes a front cavity acoustic equivalent circuit 25 of a loudspeaker unit, a rear cavity acoustic equivalent circuit 27 of the loudspeaker unit, a mechanical equivalent circuit 23 of the loudspeaker unit and an electrical equivalent circuit 21 of the loudspeaker unit. The front cavity acoustic equivalent circuit 25 of the loudspeaker unit, the rear cavity acoustic equivalent circuit 27 of the loudspeaker unit, the mechanical equivalent circuit 23 of the loudspeaker unit and the electrical equivalent circuit 21 of the loudspeaker unit can be connected through a transformer for transferring energy.

The electrical equivalent circuit 21 of the loudspeaker unit can be configured by connected in series by "$Z_{eb}$" (representing barrier electrical impedance at electrical terminal) and "V" (representing driving voltage). The mechanical equivalent circuit 23 of the microphone unit uses "$Z_D$" (representing mechanical impedance of the vibration membrane) to simulate mass, resistance and compliance effect of the vibration membrane.

The front cavity acoustic equivalent circuit 25 of the loudspeaker unit includes "$Z_{ca\_f}$" (representing acoustic capacitive reactance from front of the vibration membrane 211 to a front cover 207), "$Z_{ac\_f}$" (acoustic impedance of an opening of the front cover 207), and "$Z_{arad\_f}$" (acoustic radiation impedance of a front of the cover 207). Specifically, a series circuit formed by the "$Z_{ac\_f}$" and the "$Z_{arad\_f}$" is in parallel with the "$Z_{ca\_f}$".

The rear cavity acoustic equivalent circuit 27 of the loudspeaker unit includes "$Z_{ca\_r}$" (representing internal air acoustic capacitive resistance from rear of the vibration membrane 211 to yoke plastic 201), "$Z_{ac\_r}$" (representing air acoustic impedance of the thickness of vent hole 203 behind the yoke plastic 201), "$Z_p$" (representing acoustic impedance of the porous material 205 of vent hole 203 behind the yoke plastic 201), and "$Z_{arad\_f}$" (representing rear acoustic impedance of the yoke plastic 201). Specifically, a series circuit formed by the "$Z_{ac\_r}$", the "$Z_p$" and the "$Z_{arad\_f}$" is in parallel with the "$Z_{ca\_r}$".

In addition, a flow resistance measurement module of the invention is used to analyze pressure difference between inlet and outlet of the porous material 205, and calculate acoustic parameters of the porous material 205 according to the pressure difference, including flow resistance value (R), specific flow resistance value ($R_s$) and flow resistance rate (r), so as to obtain an actual flow resistance value ($R_p$) of the porous material 205, which is also equivalent to the actual impedance value "$Z_p$" of the porous material in the equivalent circuit model 20 of the moving coil loudspeaker.

As described above, the front cavity acoustic equivalent circuit 25 of the loudspeaker unit is coupled to transfer energy with the mechanical equivalent circuit 23 of the loudspeaker unit through a transformer with a conversion ratio of 1:$A_{D\_f}$. The rear cavity acoustic equivalent circuit 27 of the loudspeaker unit is coupled to transfer energy with the mechanical equivalent circuit 23 of the loudspeaker unit through a transformer with a conversion ratio of 1:$A_{D\_r}$, wherein "$A_{D\_f}$" represents the area in front of the vibration membrane 211, and "$A_{D\_r}$" represents the area behind the vibration membrane 211.

Through the above description, the person skilled in the technical field can know how to deduce and simplify the equivalent circuit model of the moving coil loudspeaker, such as analysis and simulation of circuit loop and equivalent circuit (such as derivation of equations) by energy conversion through conversion factors and the series circuits and parallel circuits of plural equivalent circuit components.

It should be noted that the equivalent circuit model is applied to the moving coil loudspeaker in this embodiment, the equivalent circuit method can also be applied to other kinds of loudspeakers, such as horn loudspeaker, capacitive loudspeaker, piezoelectric loudspeaker, and other electroacoustic devices with sound reinforcement function. In addition, the person skilled in the art should realize that the actual equivalent circuit structure will be changed accompanying with the type and structure of the loudspeaker unit, and the equivalent circuit model of other types of speakers or other electroacoustic devices with sound reinforcement function can be deduced from the equivalent circuit model of FIG. 2. Therefore, FIG. 2 is only a schematic diagram of an equivalent circuit model of a moving coil loudspeaker, and the invention is not limited to the example of FIG. 2.

Figure 3:
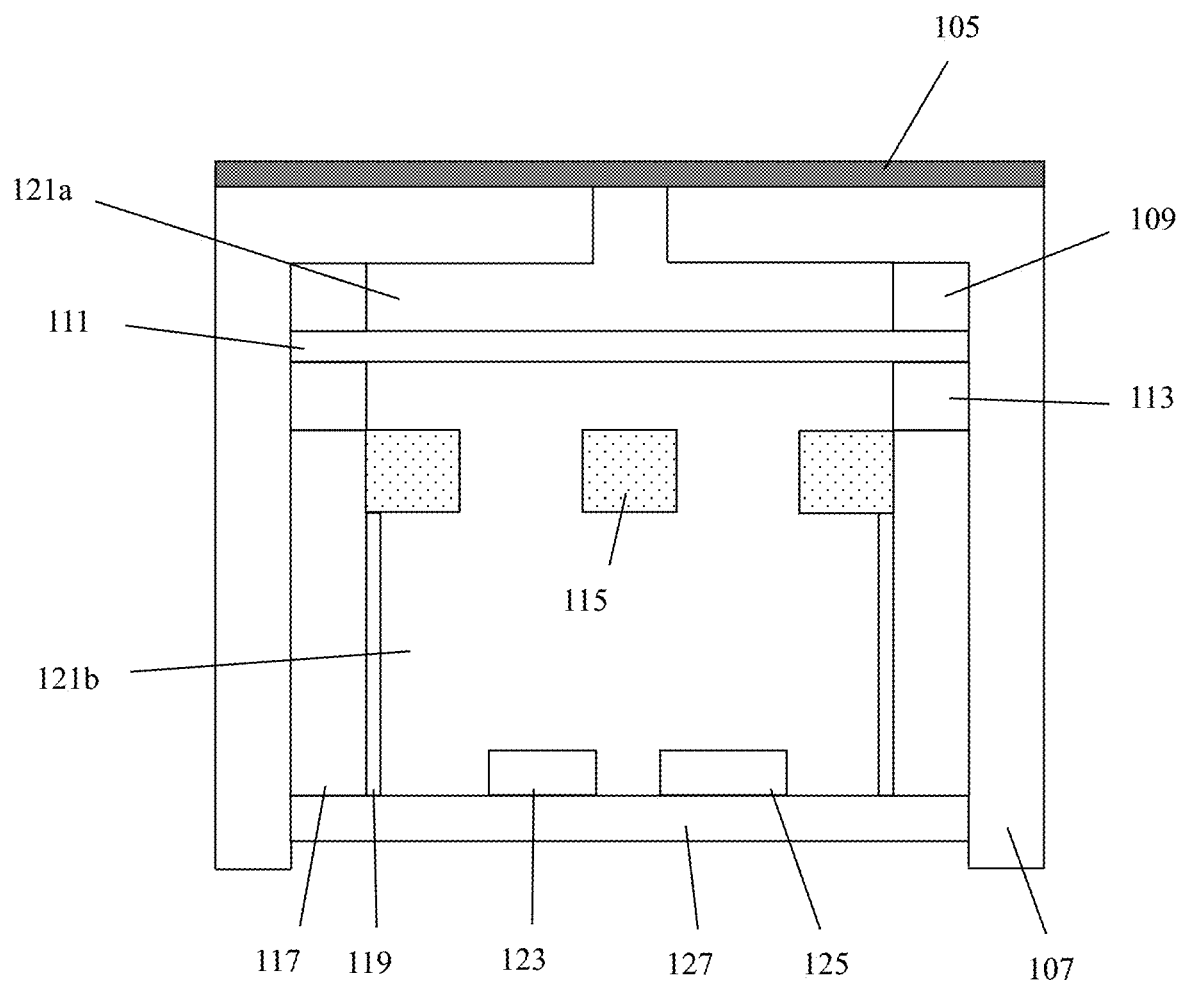
FIG. 3 illustrates a sectional drawing of a condenser microphone of one preferred embodiment of the invention.
Figure 4:
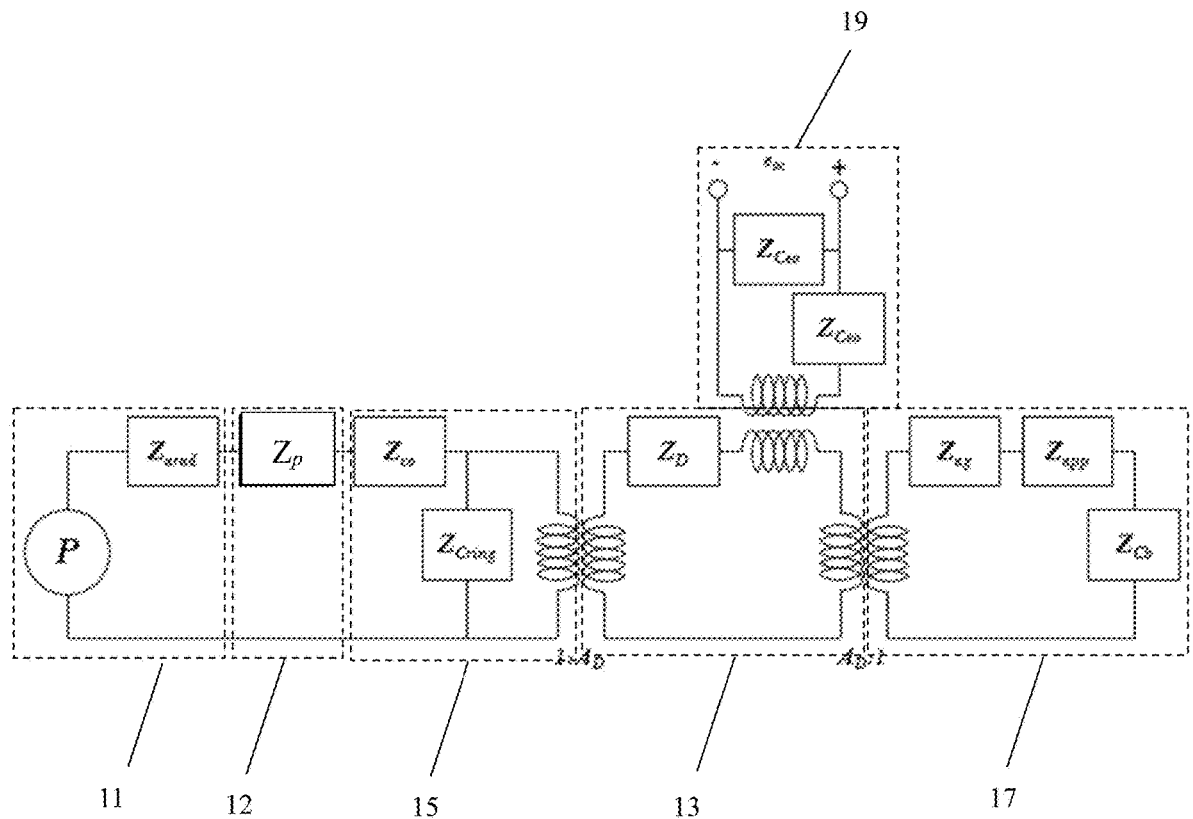
FIG. 4 shows a schematic diagram of the equivalent circuit model of the condenser microphone of one preferred embodiment of the invention corresponding to FIG. 3.

In addition, please refer to FIG. 3 and FIG. 4, FIG. 3 illustrates a sectional drawing of a condenser microphone of one preferred embodiment of the invention, and FIG. 4 illustrates a schematic diagram of the equivalent circuit model of the condenser microphone of one preferred embodiment of the invention corresponding to FIG. 3. The equivalent circuit model 10 of the condenser microphone 100 is established by the equivalent circuit method, and can be used to simulate and analyze the characteristics of the internal components and structure of the condenser microphone 100 and the impact on the sound transmission, and then simulate and analyze the characteristics of different condenser microphone 100.

The equivalent circuit model 10 of the condenser microphone includes an equivalent circuit 11 of air radiation impedance, an equivalent circuit 12 of porous material, an equivalent circuit 15 of front cavity microphone unit, an equivalent circuit 17 of rear cavity microphone unit, a mechanical equivalent circuit 13 of microphone unit and an electrical equivalent circuit 19 of microphone unit. The equivalent circuit 15 of front cavity microphone unit, the equivalent circuit 17 of rear cavity microphone unit, the mechanical equivalent circuit 13 of the microphone unit and the electrical equivalent circuit 19 of the microphone unit can be connected to transfer energy through a transformer.

Furthermore, the air pressure "P" of sound hole represents the intensity of external sound pressure (such as sound produced by the user). The equivalent circuit 11 of air radiation impedance is used to represent the equivalent circuit of the radiation impedance generated by sound pressure pushing air when the external sound pressure (i.e. the air pressure P of the receiving sound hole) is generated. The acoustic equivalent circuit 12 of porous material is the equivalent circuit model of porous material, which is used to represent the effect created by sound pressure for porous material 105. The equivalent circuit 15 of front cavity microphone unit, the equivalent circuit 17 of rear cavity microphone unit, the mechanical equivalent circuit 13 of the microphone unit and the electrical equivalent circuit 19 of the microphone unit are constructed as the equivalent circuit model of the microphone unit, which is used to represent the effects produced by sound pressure due to the internal structure, size and material characteristics of the microphone unit.

Specifically, as shown in FIG. 4, the equivalent circuit 11 of air radiation impedance is represented by the circuit of acoustic radiation impedance, such as equivalent resistance "$Z_{arad}$".

The acoustic equivalent circuit 12 of the porous material includes the acoustic impedance of the porous material 105 created by sound pressure. The acoustic impedance of the porous material 105 may be represented by an impedance equivalent circuit, such as a circuit with an equivalent resistance "$Z_p$". In addition, the flow resistance measurement module of the invention is used to analyze the pressure difference between the inlet and outlet of the porous material 105 and calculate the acoustic parameters of the porous material 105 according to the pressure difference, including the flow resistance value (R), specific flow resistance value ($R_s$) and flow resistance ratio (r), so as to obtain an actual flow resistance value ($R_p$) of the porous material 105, which is also equivalent to the actual impedance value "$Z_p$" of the porous material in the equivalent circuit model.

The front cavity acoustic equivalent circuit 15 of the microphone unit includes acoustic mass and acoustic resistance produced by sound pressure passing through the receiving sound hole of the front cover 107 within side wall of the hole, and acoustic element (such as acoustic mass) produced by sound pressure passing through the front of a vibration membrane 111. Please refer to FIG. 4, the acoustic mass and acoustic resistance generated within the side wall of the hole can be expressed by "$Z_{co}$", which represents the acoustic impedance of the space behind the front cover at the receiving sound hole. In addition, the acoustic element produced by the sound pressure passing through the front of the vibration membrane can be represented by "$Z_{cring}$", which represents the acoustic capacitive reactance of the space formed by the front of the vibration membrane and the front cover (i.e. front cavity 121a).

The air pressure of the receiving sound hole is connected in series with the equivalent circuit 11 of air radiation impedance and the acoustic equivalent circuit 12 of the porous material, and connected in parallel with the front cavity acoustic equivalent circuit 15 of the microphone unit. Specifically, the air pressure "P" of the sound hole is connected in series with the equivalent circuit "$Z_{arad}$" of the air radiation impedance and the acoustic equivalent circuit "$Z_p$" of the porous material; the air pressure "P" of the sound hole is connected in series with the equivalent circuit of the air radiation impedance and the acoustic equivalent circuit of the porous material, and connected in parallel with the series circuit formed by "$Z_{co}$" and "$Z_{cring}$".

In addition, the rear cavity acoustic equivalent circuit 17 of the microphone unit includes the simulated impedance effect generated by sound pressure pushing the vibration membrane 111 to compress air gap, the simulated acoustic mass and impedance effect generated by air flowing through sound hole arranged on a back plate 115, and the acoustic compliance effect generated by air flowing through the rear cavity 121b. Accordingly, the rear cavity acoustic equivalent circuit 17 of the microphone unit is an equivalent circuit corresponding to the internal structure of the microphone unit, which is formed by serially connecting "$Z_{ag}$" (representing acoustic impedance of the space formed by the vibration membrane 111 and the back plate 115), "$Z_{app}$" (the acoustic impedance created by the thickness of the back plate 115), and "$Z_{cb}$" (the acoustic capacitive impedance created by the space of the rear cavity 121b). "$Z_D$" (representing the mechanical impedance of the vibration membrane) in the mechanical equivalent circuit 13 of the microphone unit is used to simulate the mass, resistance and compliance effect of the vibration membrane.

The electrical equivalent circuit 19 of the microphone unit can be configured by serially connecting capacitor "$Z_{ceo}$" (representing a capacitor constructed by the vibration membrane and the back plate) with "$Z_{ceo}$" to simulate the electrical signal $e_{oc}$ sensed by the microphone unit, and the electrical equivalent circuit is represented by an open circuit.

As mentioned above, the front cavity equivalent circuit 15 of the microphone unit is coupled to the mechanical circuit 13 of the microphone unit through a transformer with a conversion ratio of 1:$A_D$ for energy transfer. The mechanical circuit 13 of the microphone unit is coupled to the rear cavity equivalent circuit 17 of the microphone unit through a transformer with a conversion ratio of $A_D$:1 for energy transfer, wherein "$A_D$" represents the area of the vibration membrane 111. The mechanical circuit of the microphone unit is coupled to the electrical equivalent circuit of the microphone unit through a transformer with a conversion ratio of 1:φ for energy transfer.

Based on the above description, the person skilled in the technical field can know how to derive and simplify the equivalent circuit model of the moving coil loudspeaker, such as analysis and simulation of circuit loop and equivalent circuit (such as derivation of equations) by energy conversion through conversion factors and the series circuits and parallel circuits of plural equivalent circuit components.

It should be noted that the equivalent circuit model is applied to the condenser microphone in this embodiment, the equivalent circuit method can also be applied to other kinds of microphones, such as piezoelectric microphone, moving coil microphone, MEMS (Micro Electro Mechanical System) microphone, and other electroacoustic devices with sound receiving function. In addition, the person skilled in the art should realize that the actual equivalent circuit structure will be changed accompanying with the type and structure of the microphone unit, and the equivalent circuit model of other types of microphones or other electroacoustic devices with sound receiving function can be deduced from the equivalent circuit model of FIG. 4. Therefore, FIG. 4 is only a schematic diagram of an equivalent circuit model of a condenser microphone, and the invention is not limited to the example of FIG. 4.

Figure 5:
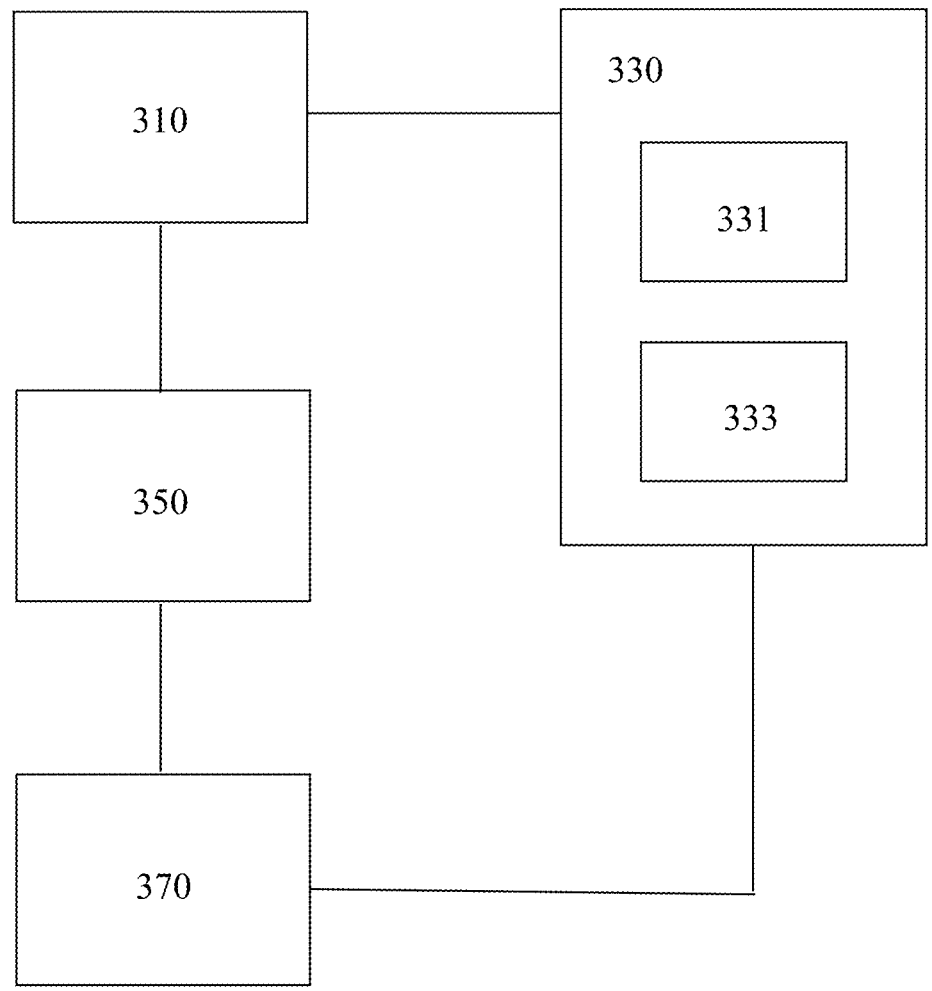
FIG. 5 illustrates a schematic diagram of the prediction system for porous material in one preferred embodiment of the invention.
Figure 6:
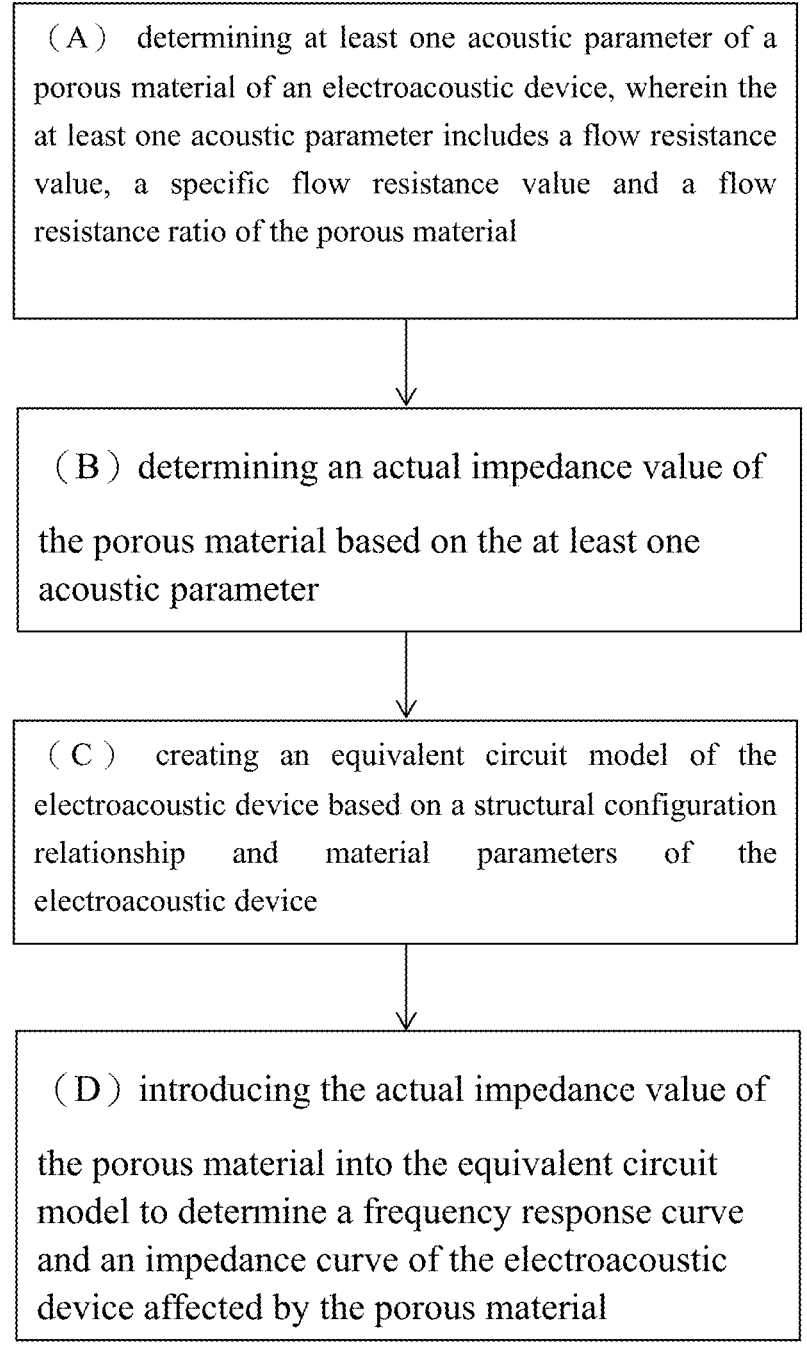
FIG. 6 illustrates a flow chart of the prediction method for porous material in one preferred embodiment of the invention.

Subsequently, please refer to FIG. 5 and FIG. 6; FIG. 5 illustrates the schematic diagram of the prediction system for porous material in one preferred embodiment of the invention, and FIG. 6 illustrates the flow chart of the prediction method for porous material in one preferred embodiment of the invention. This method and its system can be used to quickly and accurately predict and analyze the influence of porous materials on electroacoustic devices by introducing the equivalent circuit method (ECM).

As shown in FIG. 5, the prediction system 300 of porous material in one preferred embodiment of the invention comprises an electroacoustic device 310, which has a porous material 105, 205 (refer to FIG. 1 and FIG. 3); an equivalent circuit model building module 350 connected with the electroacoustic device 310, wherein an equivalent circuit model 10, 20 (refer to FIG. 2 and FIG. 4) is established by the equivalent circuit model building module 350 according to the structural configuration relationship and material parameters of the electroacoustic device 310; a flow resistance measurement module 330 connected with the electroacoustic device 310 to measure at least one acoustic parameter of the electroacoustic device 310; and a simulation calculation module 370 connected with the equivalent circuit model building module 350 and the flow resistance measurement module 330. An actual impedance value of the porous material 105 and 205 is calculated by the simulation calculation module 370 based on at least one acoustic parameter, and introduced into the equivalent circuit model 10 and 20 to simulate the frequency response curve and impedance curve affected by the porous material 105 and 205.

In this embodiment, the electroacoustic device 310 can be a loudspeaker with sound amplification function, such as moving coil loudspeaker 200 (refer to FIG. 1), horn loudspeaker, capacitive loudspeaker or piezoelectric loudspeaker, or other electroacoustic devices with sound amplification function. In addition, the electroacoustic device 310 can also be a microphone with sound reception function, such as condenser microphone 100 (refer to FIG. 3), piezoelectric microphone, moving coil microphone or MEMS microphone, or other electroacoustic devices with sound reception function.

Although the principle and the configuration of internal structure between loudspeaker and microphone are different, they all contain a porous material 105, 205 with acoustic resistance characteristics, which can reduce the vibration amplitude of the vibration membrane (film) of the electroacoustic device 310 and further reduce the performance of sound pressure at the resonance frequency. For the electroacoustic device 310 (including loudspeaker and microphone) of this embodiment, except that the acoustic parameters of porous material are unknown, the internal structure configuration, relative size relationship and other material parameters of the electroacoustic device 310 are known; for example, the parameters of the internal components can be obtained by design manufacturer of the electroacoustic device. In other words, in the prediction system 300 of porous materials, the equivalent circuit models 10 and 20 of the known electroacoustic device 310 can be established by using the above-mentioned equivalent circuit scheme (refer to FIG. 2 and FIG. 4). After the acoustic parameters of the porous materials 105 and 205 are measured, an actual impedance value of the porous materials can be calculated, and then the equivalent circuit models 10 and 20 are introduced to obtain the frequency response curve and impedance curve of the electroacoustic device 310 affected by the porous materials 105 and 205.

The porous materials 105 and 205 include ventilation paper, tuning paper, nonwoven cloth or mesh cloth, which can reduce the vibration amplitude of the vibration membrane (film) of the electroacoustic device, and further reduce the performance of sound pressure at the resonance frequency.

An equivalent circuit model is established by the equivalent circuit model building module 350 according to the structural configuration relationship and material parameters of the electroacoustic device 310. As shown in FIG. 2, the equivalent circuit model 20 of the moving coil loudspeaker is established according to the structural configuration relationship and material parameters of the moving coil loudspeaker. As shown in FIG. 4, the equivalent circuit model 10 of the moving coil loudspeaker is established according to the structural configuration relationship and material parameters of the condenser microphone.

The flow resistance measurement module 330 includes a differential pressure gauge 331 and a flowmeter 333 for measuring at least one acoustic parameter of the porous materials 105 and 205 of the electroacoustic device 310, and the at least one acoustic parameter includes flow resistance value, specific flow resistance value and flow resistance ratio of the porous materials 105 and 205.

An actual impedance value of the porous material 105 and 205 is calculated by the simulation calculation module 370 according to the at least one acoustic parameter (flow resistance value, specific flow resistance value and flow resistance ratio), and the equivalent circuit model (such as the equivalent circuit model 20 of the moving coil loudspeaker or the equivalent circuit model 10 of the condenser microphone) is introduced to simulate the frequency response and impedance curve of the electroacoustic device 310 affected by the porous material 105 and 205. The simulation calculation module 370 is implemented by Mathematica or MATLAB software.

FIG. 6 illustrates the flow chart of the prediction method of the aforementioned prediction system of porous material, in which the acoustic parameters of the porous material of the electroacoustic device (including loudspeaker and microphone) in this embodiment are unknown, and the internal structure configuration, relative size relationship, material and other parameters of the electroacoustic device are known.

First, in step (A), at least one acoustic parameter of a porous material of an electroacoustic device is obtained, and the at least one acoustic parameter includes a flow resistance value, a specific flow resistance value and a flow resistance ratio of the porous material. The electroacoustic device can be a loudspeaker with sound amplification function, such as a moving coil loudspeaker (refer to FIG. 1), a horn loudspeaker, a capacitive loudspeaker or a piezoelectric loudspeaker, or other electroacoustic devices with sound amplification function. In addition, the electroacoustic device can be a microphone with sound reception function, such as a condenser microphone (refer to FIG. 3), a piezoelectric microphone, a moving coil microphone or a MEMS microphone, or other electroacoustic devices with sound reception function. The porous material comprises ventilating paper, tuning paper, nonwoven cloth or mesh cloth.

The acoustic parameters are measured by the flow resistance measurement module in the prediction system. The measurement method is that ambient air in the measurement tube (pipe) is controlled to a flow rate by the flowmeter, and the pressure difference between two ends of the porous material is calculated by the differential pressure meter. The flow rate can be 0.2 to 0.8 (m/s), and the preferred flow rate is 0.5 (m/s).

After obtaining the pressure difference of the porous material, according to the known thickness and area of the porous material, the acoustic parameters (i.e. flow resistance value, specific flow resistance value and flow resistance ratio) of the porous material can be calculated. Among them, the individual definitions of the flow resistance value (R), the specific flow resistance value ($R_s$) and flow resistance ratio (r) are as follows:

(1) flow resistance value (R), unit (acoustic ohm) or (Pa–s/m$^3$)

$$R = \frac{\Delta p}{q} = \frac{\Delta p}{A \cdot v}$$

Where, A is the surface area of the porous material when measured; v is the flow rate of the ambient air in the measurement tube; $\Delta p$ is the pressure difference between the two ends of the porous material.

(2) specific flow resistance value ($R_s$), unit (rayl/m) or (Pa–s/m$^2$)

$$R_s = R \cdot A = \frac{\Delta q}{v}$$

(3) flow resistance ratio (r), unit (rayl) or (Pa–s/m)

$$r = \frac{R_s}{d} = \frac{\Delta p}{d \cdot v}$$

Where, d is the thickness of the porous material when measured.

In step (B), an actual impedance value of the porous material is calculated by the simulation calculation module according to the at least one acoustic parameter, and the calculation method of the actual impedance value is to divide the above-mentioned specific flow resistance by the area ($A_r$) of the single opening in the back opening of the electroacoustic device, and divided by the actual opening number (N), and then obtain the actual impedance value ($R_p$) of the porous material used in the electroacoustic device. It can also be used to represent the impedance ($Z_p$) of the porous material in the equivalent circuit model.

$$Z_p = R_p = \frac{R_s}{A_r \cdot N}$$

Where, $A_r$ is the area of the single opening in the back opening of the electroacoustic device; N is the opening number of the electroacoustic device. The simulation calculation module is implemented by Mathematica or MATLAB.

Subsequently, in step (C), an equivalent circuit model of an electroacoustic device is established by the equivalent circuit model building module according to the structural configuration relationship and material parameters of the electroacoustic device. As shown in FIG. 2, the equivalent circuit model of the moving coil loudspeaker is established according to the structural configuration relationship and material parameters of the moving coil loudspeaker. As shown in FIG. 4, the equivalent circuit model of the moving coil loudspeaker is established according to the structural configuration relationship and material parameters of the condenser microphone.

Finally, in step (D), the actual impedance value $R_p$ (or $Z_p$) of the porous material is introduced into the equivalent circuit model, and the frequency response curve and impedance curve of the electroacoustic device affected by the porous material can be calculated. For example, once the actual impedance value of the porous material is introduced into the equivalent circuit model of the moving coil loudspeaker in FIG. 2, the frequency response curve and impedance curve of the moving coil loudspeaker affected by the porous material can be obtained; the actual impedance value of the porous material is introduced into the equivalent circuit model of the condenser microphone in FIG. 4, and then the frequency response curve and impedance curve of the condenser microphone affected by the porous material can be obtained.

In conclusion, the unknown parameters of the porous material applied to the electroacoustic device can be simulated, predicted and analyzed according to the method and system of the invention.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A prediction method of porous material, comprising:
   (A) measuring at least one acoustic parameter of a porous material of an electroacoustic device, wherein said at least one acoustic parameter includes a flow resistance value, a specific flow resistance value and a flow resistance ratio of said porous material;
   wherein said at least one acoustic parameter is determined by controlling ambient air in a measurement tube to a flow rate to calculate a pressure difference between two ends of said porous material;
   wherein said flow rate is 0.2 to 0.8 (m/s);
   (B) determining an actual impedance value of said porous material by said at least one acoustic parameter;
   (C) creating an equivalent circuit model of said electroacoustic device by a structural configuration relationship and material parameters of said electroacoustic device;
   wherein if said electroacoustic device is a loudspeaker, said equivalent circuit model of said loudspeaker comprises a loudspeaker front cavity acoustic equivalent circuit, a loudspeaker rear cavity acoustic equivalent circuit, a loudspeaker mechanical equivalent circuit and a loudspeaker electrical equivalent circuit, and said loudspeaker front cavity acoustic equivalent circuit, said loudspeaker rear cavity acoustic equivalent circuit, said loudspeaker mechanical equivalent circuit and said loudspeaker electrical equivalent circuit are connected through a transformer for transferring energy;
   wherein if said electroacoustic device is a microphone, said equivalent circuit model of said microphone comprises a microphone air radiation impedance equivalent circuit, a microphone porous material equivalent circuit, a microphone front cavity equivalent circuit, a microphone rear cavity equivalent circuit, a microphone mechanical equivalent circuit and a microphone electrical equivalent circuit, and said microphone front cavity equivalent circuit, said microphone rear cavity equivalent circuit, said microphone mechanical equivalent circuit and said microphone electrical equivalent circuit are connected to transfer energy through said transformer; and
   (D) introducing said actual impedance value of said porous material into said equivalent circuit model to determine a frequency response curve and an impedance curve of said electroacoustic device.

2. The method of claim 1, wherein said microphone is a condenser microphone, a piezoelectric microphone, a moving coil microphone or a MEMS (Micro Electro Mechanical System) microphone.

3. The method of claim 1, wherein said loudspeaker is a moving coil loudspeaker, a horn loudspeaker, a capacitive loudspeaker or a piezoelectric loudspeaker.

4. The method of claim 1, wherein said porous material includes ventilation paper, tuning paper, nonwoven cloth or mesh cloth.

* * * * *